United States Patent [19]
Register

[11] Patent Number: 5,594,620
[45] Date of Patent: Jan. 14, 1997

[54] SECONDARY DISPLAY SYSTEM HAVING A PLURALITY OF CLAMPING DEVICES FOR MOUNTING ON A COMPUTER MONITOR

[75] Inventor: David S. Register, Austin, Tex.

[73] Assignee: Dell U.S.A., L.P., Austin, Tex.

[21] Appl. No.: 544,341

[22] Filed: Oct. 17, 1995

Related U.S. Application Data

[63] Continuation of Ser. No. 92,846, Jul. 16, 1993, abandoned.

[51] Int. Cl.$^6$ .................. G06F 1/16; H05K 7/02
[52] U.S. Cl. ........................ 361/681; 248/923
[58] Field of Search .............. 364/708.1; 248/186.1, 248/917–923; 361/681, 682; 312/223.2, 223.3

[56] References Cited

U.S. PATENT DOCUMENTS 4,693,443  9/1987  Drain ........................... 248/289.11 X
5,537,290  7/1996  Brown et al. ........................... 361/681

Primary Examiner—Michael W. Phillips
Attorney, Agent, or Firm—Haynes and Boone, L.L.P.

[57] ABSTRACT

Apparatus and method for a secondary display system for a computer are disclosed. A secondary display system of the present invention includes a flat panel display configured such that the display is conveniently located both during and between use thereof. The system comprises a liquid crystal display module (LCDM), a corresponding display controller connected to the LCDM via an appropriate interface, and a mounting device connected to the LCDM for mounting and positioning the LCDM in close proximity to the monitor of a computer. In a preferred embodiment, the mounting device comprises a plurality of clamping devices, which are disposed between a monitor of the computer, and a single axis hinge. The LCDM is attached to the hinge so that the LCDM may be rotated on a vertical axis. During use, the LCDM may be rotated such that its display screen is coplanar with the display screen of the monitor. Between uses, the LCDM may be rotated such that its display screen is substantially orthogonal to the display screen of the monitor.

8 Claims, 2 Drawing Sheets

SECONDARY DISPLAY SYSTEM HAVING A PLURALITY OF CLAMPING DEVICES FOR MOUNTING ON A COMPUTER MONITOR

This is a continuation Ser. No. 08/092,846 filed on Jul. 16, 1993 now abandoned.

TECHNICAL FIELD

The invention relates generally to display systems for computers and, more specifically, to a secondary display system for a computer.

BACKGROUND OF THE INVENTION

Modern personal computers (PCs) make extensive use of graphical user interfaces (GUIs). GUIs enable multiple data sets and applications to be simultaneously displayed and manipulated by means of "windows" imaged on the PC's display and a pointing device for controlling the size and placement of the windows. Windows may be partially or completely overlapping, reduced to iconic representation, or expanded to fill the entire display. A pervasive example of the above-described type of GUI is the Microsoft Windows software program.

A problem commonly experienced by GUI users results during attempts to display more than one large window on a single computer display at one time, as a typical display is too small to display two or more windows without substantial overlap therebetween. A solution to this problem has been to develop monitors that are larger and have a substantially greater display area than typical monitors. Such monitors are capable of displaying several large windows simultaneously; however, they generally require more desk space than most users are willing or able to spare.

Dual monitor systems are also known and employed to enable the display of more than one large window at a time. In such dual monitor systems, a secondary display controller and associated display are interfaced to the computer in parallel with the primary display controller and associated display. GUI software is commercially available which regards the dual displays as a single correspondingly larger virtual display system, so that cursor manipulations and data entry move from screen to screen in a natural manner. A single data window may be configured to span both screens, although the physical gap in the middle of the larger virtual display, due to the fact that computer monitors cannot be positioned sufficiently close together, is distracting to most users. More typically, one display will be used for displaying active data entry, while the other will be used for displaying static reference data, for example, help screens. Dual display systems suffer the same drawback as large display systems with respect to the amount of space required to use them.

Because the allocation of additional desk space by a user to his or her computer is usually unacceptable or impossible, despite the prospect of improved productivity that may be achieved therewith, computers incorporating larger monitors or dual display systems are not in widespread use. Therefore, what is needed is an apparatus for providing a computer with a larger display area that does not require additional desk space and that minimizes the physical gap inherent in a dual display system.

SUMMARY OF THE INVENTION

The foregoing problems are solved and a technical advance is achieved by an apparatus for a secondary display system for a computer. In a departure from the art, a secondary display system of the present invention includes a flat panel display configured such that the display may be conveniently located both during and between use thereof. The system comprises a liquid crystal display module (LCDM), a corresponding display controller for interfacing the LCDM to the computer, and means connected to the LCDM for mounting and positioning the LCDM in close proximity to the primary display of the computer.

The LCDM comprises an addressably matrixed display surface and backlight system enclosed in a relatively slim housing. The corresponding display controller comprises a printed circuit board which includes all the control, storage and interface circuitry necessary for interfacing the LCDM to a PC. The controller may be embodied as an integrated circuit (IC) card that is plugged in to an expansion bus resident on the computer, or may be built into the motherboard of the PC. The controller interfaces with the LCDM via a cable.

Although the mounting and positioning means may take any number of different physical forms, its function is to enable the LCDM to be positioned conveniently close to the primary display of the computer, so as to minimize the physical gap between the displays, and to be retracted to lie flat against the primary display when not in use.

In a preferred embodiment, the mounting means comprises a rectangular plate, which may be constructed of metal or hard plastic, for example. The positioning means comprises a single axis hinge, which is connected to a front corner of the plate such that the axis of the hinge is orthogonal to the plane of the plate. One edge of the LCDM is attached to the hinge so that the LCDM may be rotated on a vertical axis in a manner similar to a household door. The plate is interposed between the computer's chassis and monitor, so that the monitor rests atop the plate to provide a counterbalancing moment to the cantilevered LCDM. Any cabling necessary for interfacing the LCDM with the display controller is routed through the hinge, in a manner similar to a notebook computer.

During use, the LCDM may be rotated and positioned such that its display surface is substantially coplanar with the display surface of the monitor. Between uses, the LCDM may be rotated toward the back of the monitor and positioned so that its display surface is substantially orthogonal to the monitor, thereby minimizing the amount of space occupied by the LCDM.

In an alternative embodiment, the mounting means comprises a plurality of clamping devices, rather than a horizontal plate, which clamping devices are connected to the hinge along the axis thereof. Similar to the preferred embodiment, one edge of the LCDM is attached to the hinge such that the LCDM is rotatable on the axis of the hinge. Use of the clamping devices, rather than the plate, enables the secondary display system to be used in connection with portable, as well as desktop, computers and further enables alternate placement of the LCDM relative to the computer display. For example, the LCDM may be attached to the top, rather than a side, of the display and rotated back to rest atop the display when not in use.

In another alternative embodiment, the LCDM comprises a two sided display and the positioning means further comprises first and second arms connected at opposite ends of the hinge and extending in the same direction perpendicular to the hinge. The free end of the first arm is pivotally connected to the center of one edge of the LCDM. The free end of the second arm is pivotally connected to the center of the opposite edge of the LCDM. As a result, the LCDM may be rotated on an axis extending through the center of the LCDM as defined by the pivotal connections. In addition, the LCDM may be rotated on the axis of the hinge. In this alternative embodiment, the mounting device may comprise either a horizontal plate or a plurality of clamping devices, as described above.

A technical advantage achieved with the invention is that the secondary display may be positioned in close proximity to the computer display so that any physical gap that results when the two displays are used as a single large display is minimized.

A further technical advantage achieved with the invention is that the secondary display requires less desk space than prior art dual display systems.

DETAILED DESCRIPTION OF THE PREFERRED EMBODIMENT

Figure 1:
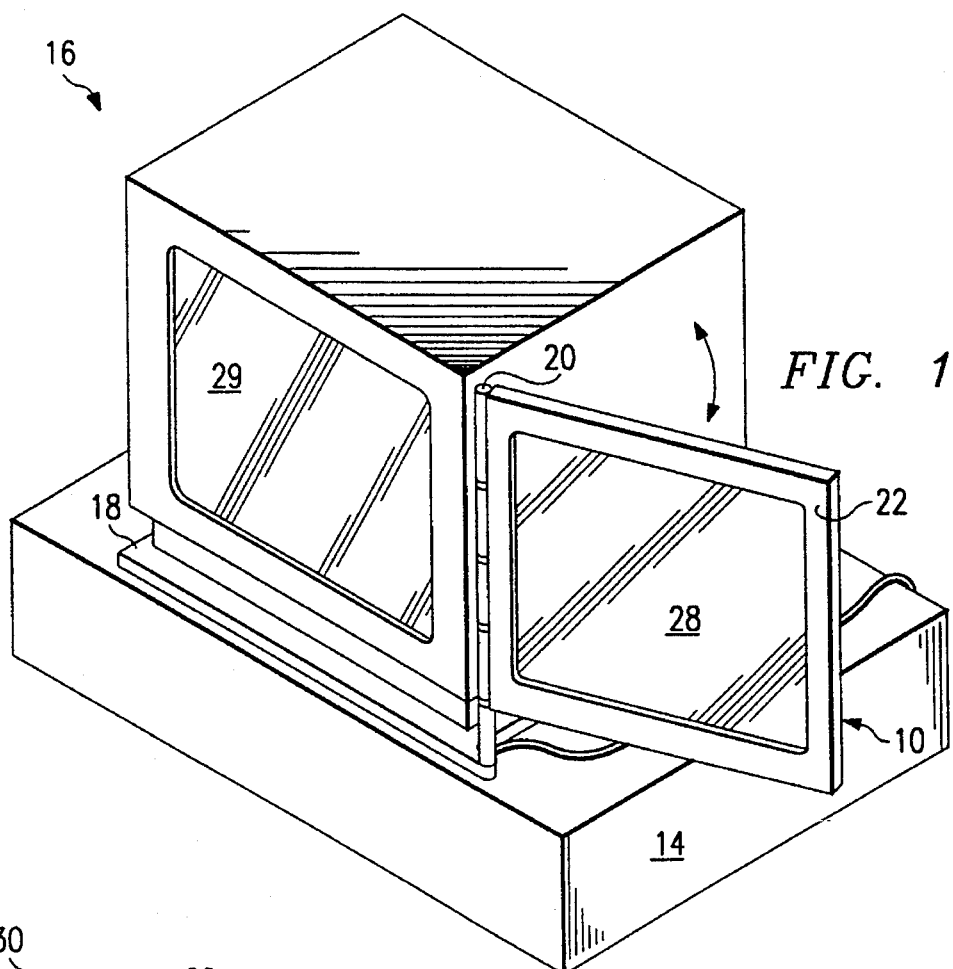
FIG. 1 is a perspective view of a preferred implementation of a secondary display system embodying features of the present invention.
Figure 2:
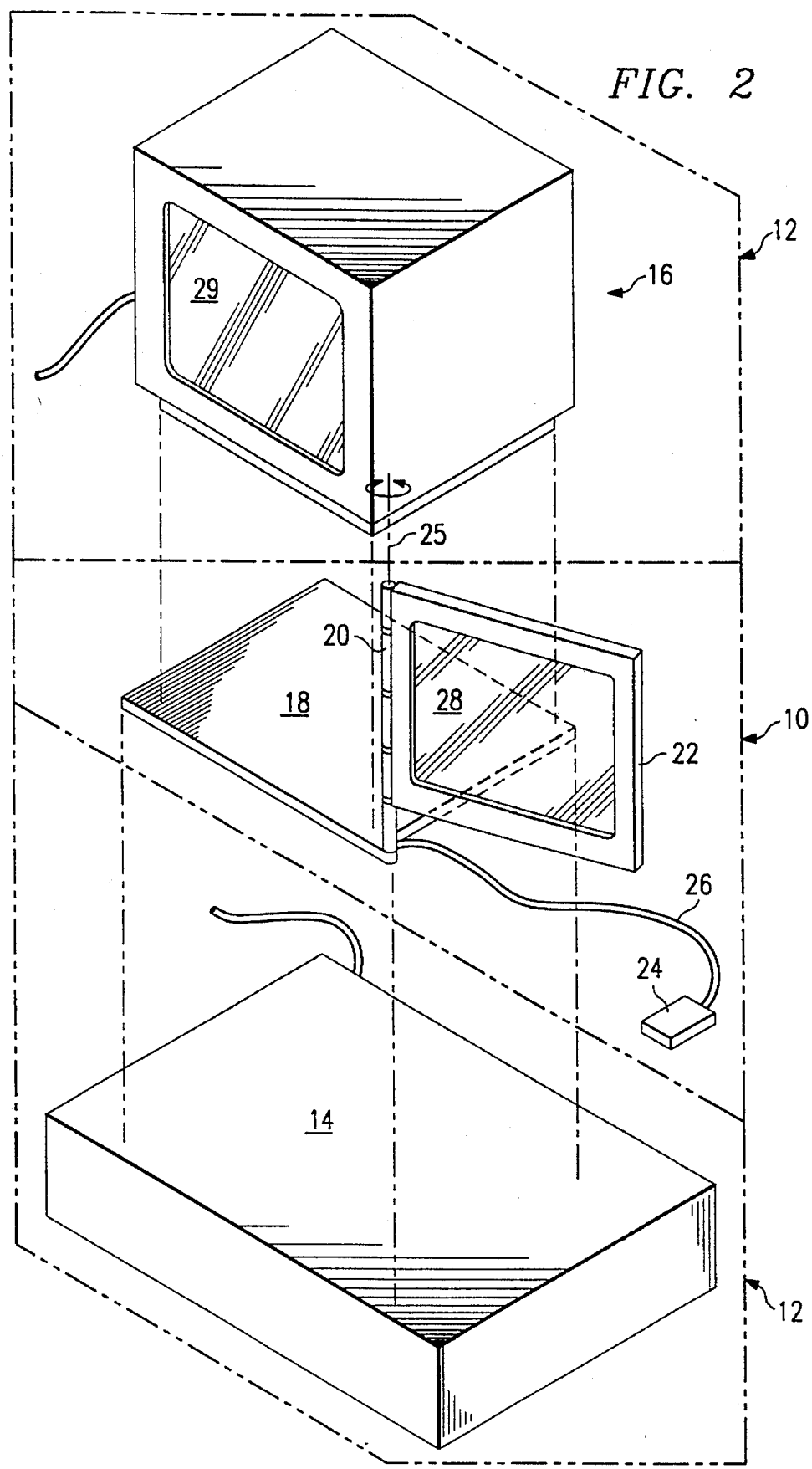
FIG. 2 is an exploded view of the implementation of the secondary display system of FIG. 1.

FIGS. 1 and 2 illustrate a preferred embodiment of a secondary display system of the present invention. Referring to FIG. 2, the reference numeral 10 designates the secondary display system. The display system 10 is implemented on a computer 12 having a chassis 14 connected to a display or monitor 16, which rests on the top surface of the chassis 14, via a cable 17. The system 10 comprises a mounting arrangement, such as a plate 18, a positioning element, such as a single axis hinge 20, a liquid crystal display module (LCDM) 22, and a display controller 24. In the illustrated embodiment, the plate 18 is a horizontally disposed rectangular member constructed of metal or hard plastic, for example. The hinge 20 is connected to a corner of the plate 18 such that an axis 25 of the hinge 20 is orthogonal to the plane of the plate 18. One edge of the LCDM 22 is connected to the hinge 20 such that the LCDM 22 is rotatable on the axis 25 of the hinge 20, in a manner similar to a household door. The display controller 24 comprises the circuitry necessary for controlling the operation of the LCDM 22 and may embodied in an IC card inserted into an expansion bus (not shown) resident on the computer 12 or built in to the motherboard of the computer 12. Controllers such as the controller 24 are well known to those skilled in the art and will not be further described.

The controller 24 is connected to the LCDM 22 via an interface cable 26. The cable 26 and other cabling or circuitry necessary for interfacing the LCDM 22 with the controller 24 are routed through the hinge 20, similar to the method used in connection with notebook and other portable computers. The plate 18 is placed on top of the chassis 14 and the monitor 16 is positioned so that it rests on the plate 18, thereby providing a counterbalancing moment to the cantilevered LCDM 22.

During use of the system 10, the LCDM 22 may be rotated and positioned such that its display surface 28 is substantially coplanar with the display surface 29 of the monitor 16.

Between uses, the LCDM 22 may be rotated toward the back of the monitor and positioned so that its display surface 28 is substantially orthogonal to that of the monitor 16, thereby minimizing the amount of desk space occupied by the LCDM 22.

Figure 3:
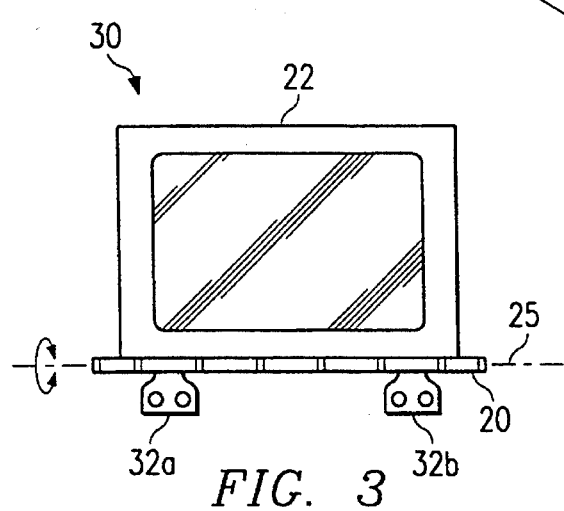
FIG. 3 is an alternative embodiment of the secondary display system of the present invention.

Referring to FIG. 3, a reference numeral 30 designates an alternative embodiment of the secondary display system 10 (FIGS. 1 and 2). Similar to the system 10, the system 30 includes the LCDM 22 connected to the display controller 24 (FIGS. 1 and 2) via the interface cable 26 (FIGS. 1 and 2), and a positioning element comprising the single axis hinge 20, which is attached to one edge of the LCDM 22. Unlike the system 10, however, the mounting arrangement of the system 30 comprises a plurality of clamping devices 32a, 32b for clamping the system 20 to the display of a computer (not shown) rather than the plate 18. Therefore, the system 30 may be used in combination with both conventional desktop and portable computers. Further, the system 30 may be attached to enable a variety of display configurations, e.g., side-by-side displays or upper and lower displays.

Figure 4:
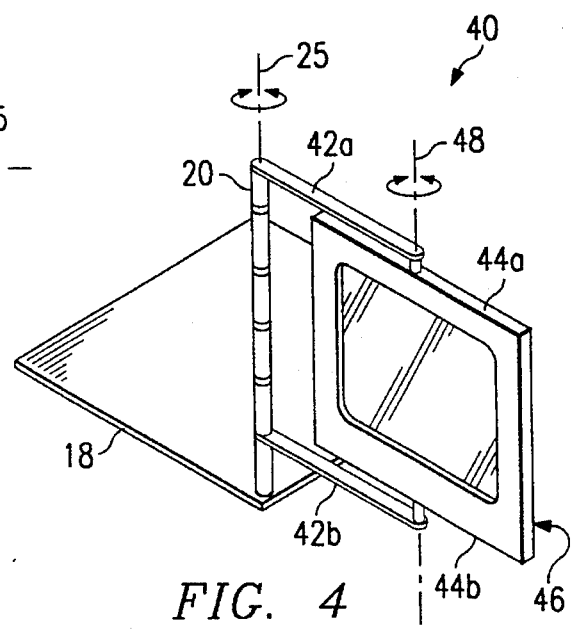
FIG. 4 is another alternative embodiment of the secondary display system of the present invention.

Referring to FIG. 4, a reference numeral 40 designates another alternative embodiment of the secondary display system 10 (FIGS. 1 and 2). Similar to the system 10, the mounting arrangement of the system 40 comprises the plate 18. However, the positioning element of the system 40 comprises the hinge 25 and first and second coplanar arms 42a, 42b connected to the hinge 25 at opposite ends thereof and in a manner perpendicular to the axis 25 of the hinge 20. The first arm 42a is pivotally connected to the center of an edge 44a of a two-sided LCDM 46 and the second arm 42b is pivotally connected to the center of the opposite edge 44b of the LCDM 46. Therefore, in addition to being rotatable on the axis 25 of the hinge 20, the LCDM 46 is also rotatable on a second axis 48, which is parallel to the axis 25, to enable a user to rotate the LCDM 46 to use either or both sides of the LCDM 46, as well as to rotate it out and back during use and between uses.

Therefore, with respect to any of the illustrated embodiments, a secondary display is provided on a computer which display utilizes a minimum amount of desk space and which is conveniently positioned in close proximity to the primary display of the computer.

It is understood that the present invention can take many forms and embodiments. The embodiments shown herein are intended to illustrate rather than to limit the invention, it being appreciated that variations may be made without departing from the spirit or the scope of the invention. For example, mounting arrangement of the system 40 may comprise clamping devices 32a, 32b rather than the plate 18. Further, the system 10, 20 or 40 may be permanently, rather than removably, mounted to a computer.

Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

What is claimed is:

1. A secondary display system for a computer having a primary display, the system comprising:

a flat panel display operating as a secondary display to said primary display of said computer;

a display controller electrically connected between said computer and said flat panel display for interfacing said flat panel display to said computer;

means connected to said flat panel display for positioning said flat panel display relative to said computer and to said primary display, said positioning means defining an axis on which said flat panel display is rotatable; and a plurality of clamping devices connected to said positioning means for clamping said system to said computer such that said positioning means is adjacent and parallel to an edge of said primary display.

2. The system of claim 1 wherein said positioning means comprises a single axis hinge, said clamping means being disposed along the axis of said hinge in a spaced relationship to one another.

3. A secondary display system for a computer having a primary display, the system comprising:

a flat panel display operating as a secondary display to said primary display of said computer;

a display controller electrically connected to said flat panel display for interfacing said flat panel display to said computer;

means connected to said flat panel display for positioning said flat panel display relative to said computer, said positioning means defining an axis on which said flat panel display is rotatable and comprising:
a hinge;
a first arm connected to said hinge near a first end of said first arm and pivotally connected to a first edge of said flat panel display near a second end of said first arm; and;
a second arm connected to said hinge hear a first end of said second arm and pivotally connected to a second edge of said flat panel display direction opposite said first edge near a second end of said second arm;
wherein said first and second arms are coplanar and said flat panel display is rotatable on a second axis defined by said pivotal connections; and a plurality of clamping devices disposed along the axis of said hinge in a spaced relationship to one another for clamping said system to said computer.

4. A secondary display system for a computer having a primary display, the system comprising:

a flat panel display operating as a secondary display to said primary display of said computer;

a display controller electrically connected to said flat panel display for interfacing said flat panel display to said computer;

a hinge parallel to an edge of said flat panel display and connected to said edge of said flat panel display for enabling rotation of said flat panel display about an axis of said hinge between first and second positions relative to said primary display of said computer; and a plurality of clamping devices disposed along said axis of said hinge in a spaced relationship with one another for clamping said system to said computer such that said hinge is adjacent and parallel to an edge of said primary display.

5. The system of claim 4 wherein said computer comprises a desktop computer.

6. The system of claim 4 wherein said computer comprises a notebook computer.

7. A secondary display system for a computer, the system comprising:

a flat panel display;

a display controller electrically connected to said flat panel display for providing an electrical interface between said flat panel display and said computer;

means connected to said flat panel display for positioning said flat panel display relative to said computer, said positioning means comprising:
a hinge defining a first axis of rotation of said flat panel display;
a first arm extending perpendicularly from said hinge, a first end of which first arm is connected to said hinge and a second end of which first arm is pivotally connected to a first edge of said flat panel display; and
a second arm extending perpendicularly from said hinge, a first end of which second arm is connected to said hinge and a second end of which second arm is pivotally connected to a second edge of said flat panel display directly opposite said first edge;
wherein said first and second arms are coplanar and said pivotal connections define a second axis of rotation of said flat panel display; and a plurality of clamping devices disposed along the axis of said hinge in a spaced relationship to one another for clamping said system to said computer.

8. The system of claim 7 wherein said computer is a desktop computer.

* * * * *